United States Patent [19]

Eftefield

[11] 3,986,784
[45] Oct. 19, 1976

[54] WELDMENT
[75] Inventor: Larry G. Eftefield, Joliet, Ill.
[73] Assignee: Caterpillar Tractor Co., Peoria, Ill.
[22] Filed: Apr. 9, 1975
[21] Appl. No.: 566,500

[52] U.S. Cl. .................................. 403/272; 403/13; 228/189
[51] Int. Cl.² ........................ B25G 3/34; F16B 5/08
[58] Field of Search .......... 403/268, 270, 271, 272, 403/12, 13; 228/176, 216, 182, 187, 189; 52/758 B

[56] References Cited
UNITED STATES PATENTS

| | | | |
|---|---|---|---|
| 1,978,609 | 10/1934 | Straty | 52/758 B |
| 2,895,747 | 7/1959 | Bland et al. | 228/216 X |
| 2,914,846 | 12/1959 | Baldus et al. | 403/272 X |
| 3,921,728 | 11/1975 | Casey | 403/270 X |

*Primary Examiner*—Wayne L. Shedd
*Attorney, Agent, or Firm*—Wegner, Stellman, McCord, Wiles & Wood

[57] ABSTRACT

A weldment wherein two members are joined by a weld bounded at a back portion by a back-up member providing improved weld penetration and prevention of undesirable conditions in the weld such as root gaps or blow-throughs. The back-up member may comprise an elongated element secured to the surface of one member and, more specifically, may be welded thereto by a continuous weld.

5 Claims, 5 Drawing Figures

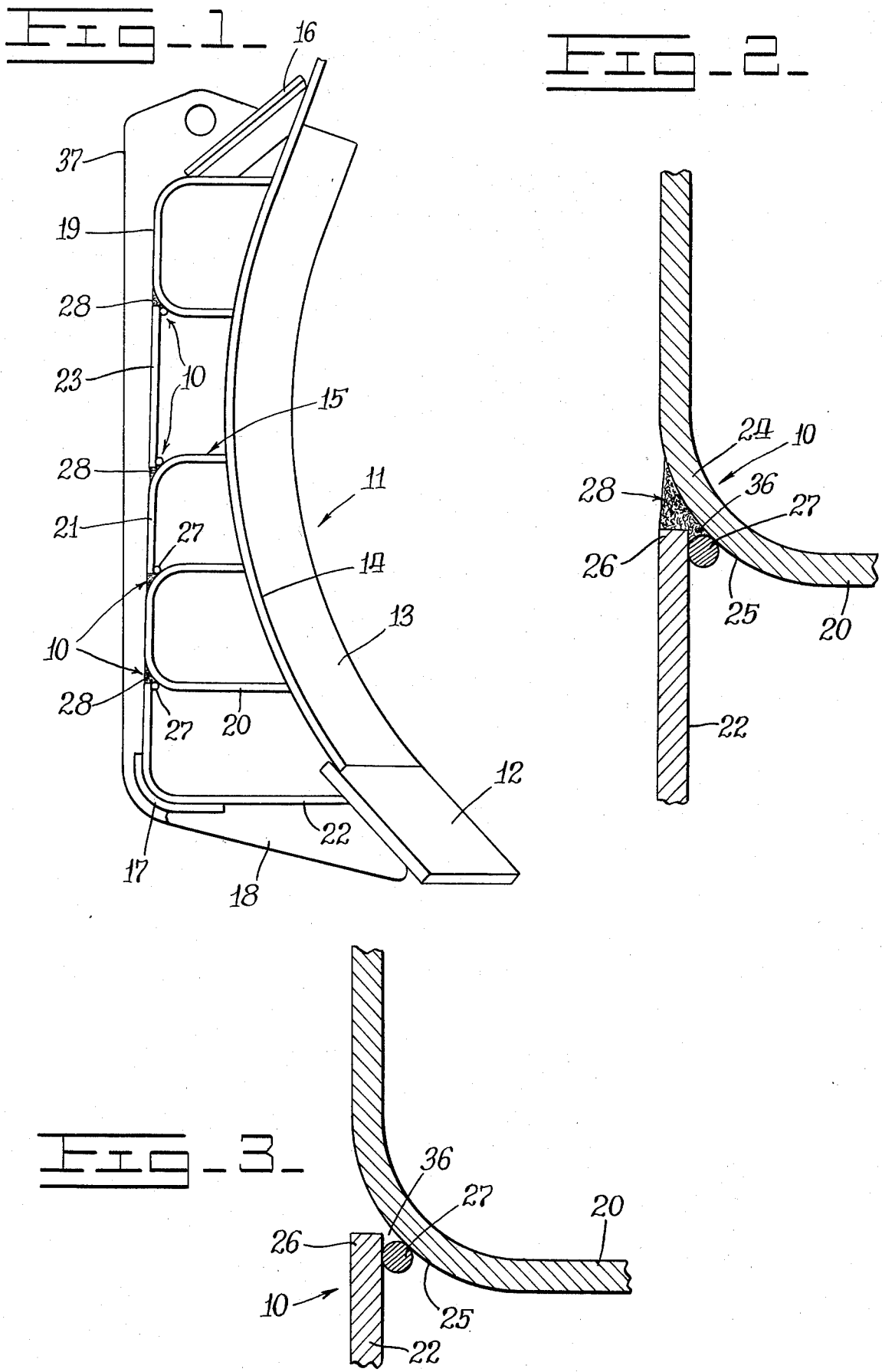

WELDMENT

BACKGROUND OF THE INVENTION

1. Field of the Invention

This invention relates to welding and, in particular, to weldments and methods of forming weldments wherein two plate members are joined by arc welding.

2. Description of the Prior Art

In copending application for U.S. Letters Pat. Ser. No. 469,337 of Thomas P. Casey, filed May 13, 1974, issued Nov. 25, 1975 as Pat. No. 3,921,728, and owned by the assignee hereof, for a Weldment for Bulldozer Blades and Method and Apparatus Therefor, a bulldozer blade is disclosed having a plurality of structural members welded together by means of an improved weldment comprising a groove and a contiguous dam formed on the surface of one member with a corner portion of the other member disposed adjacent thereto. Common weld means are provided for substantially filling the groove and securing the members together. The groove and dam structure may be provided in an arcuate portion of the first member in a cold forming operation. As brought out in said application, such structure prevents undesirable blow-through during the welding process, effectively preventing crack formation which may cause premature failure of the welded structure.

SUMMARY OF THE INVENTION

The present invention comprehends a further improved weldment and method of forming a weldment which eliminates the undesirable root gap or blow-through conditions of the prior art in a further improved and simplified manner.

More specifically, the invention comprehends providing one member intended to be welded to a second member, with a back-up means effectively preventing undesirable blow-through and the like, wherein the back-up means is defined by an elongated element forming a weld stop on the first member surface at the rear of the weld space wherein the desired welded joint is formed.

More specifically, the back-up means may comprise a rod welded to the surface of the first member. In the illustrated embodiment the rod is welded to an arcuate surface of the first member.

The second member may overlap the back-up element so as to partially overlie the weld space and provide further improved welding of the second member to the first member.

The back-up element may comprise a rod welded to the first member as by a suitable welding operation. Where the first member is cylindrically arcuate, the rod may extend coaxially thereof, and in the illustrated embodiment is disposed on the outer arcuate surface.

The back-up element may be relatively bulky so as to absorb the heat in the welding operation and thereby provide a further improved weldment by avoiding burn-out of portions of the members being joined.

In the illustrated embodiment, the back-up element comprises a steel rod having a circular cross section which is continuously resistance welded to the outer arcuate surface of the first member with the edge of the second member being brought closely to adjacent the arcuate surface in overlapping relationship to the weld space defined cooperatively between back-up element and the weld members.

Thus, the present invention comprehends an improved weld which is extremely simple and economical of construction, while yet providing the above described advantages.

BRIEF DESCRIPTION OF THE DRAWING

Other features and advantages of the invention will be apparent from the following description taken in connection with the accompanying drawing wherein:

FIG. 1 is a side elevation of a bulldozer blade having support members joined together by improved weldments embodying the invention;

FIG. 2 is an enlarged vertical section of one of the weldments;

FIG. 3 is a cross section similar to that of FIG. 2, but prior to the welding operation;

DESCRIPTION OF THE PREFERRED EMBODIMENT

Figure 4:
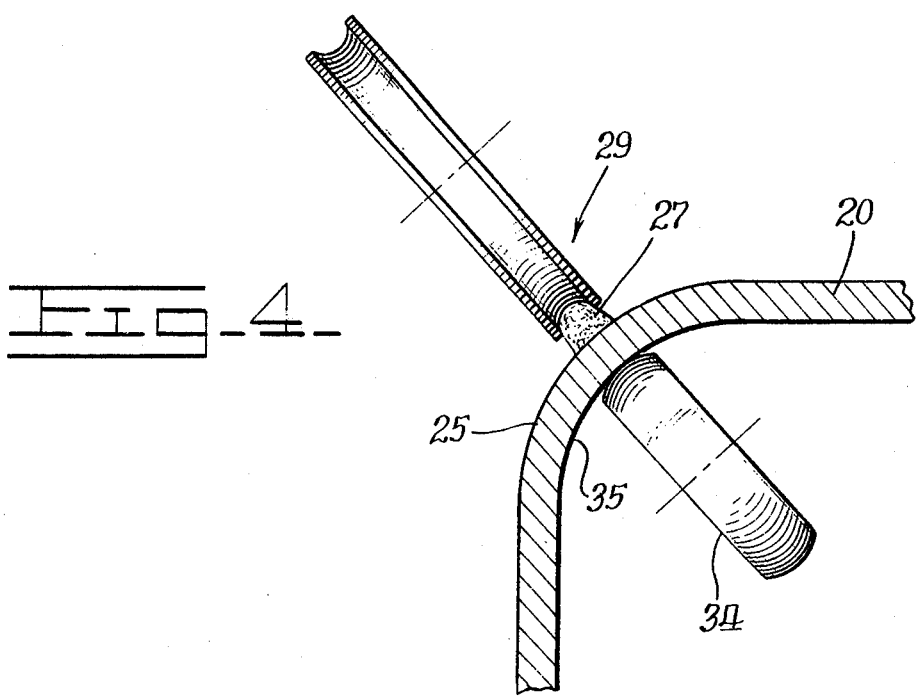
FIG. 4 is a cross sectional view illustrating one method of securing the back-up element to the first weld member.

In the exemplary embodiment of the invention as disclosed in the drawing, a plurality of weldments, generally designated 10, embodying the invention are utilized in forming the structure of a device such as the bulldozer blade generally designated 11. Such bulldozer blades conventionally include cutting edge members 12 secured to the lower end of a pair of mold board plates 13 (one of which is illustrated in FIG. 1 of the drawing). The mold board plates are secured to the opposite lateral ends of a push plate 14 which is structurally reinforced by a plurality of support members designated 15. The support members may include end support members 16 and 17 and gusset members 18. The support members further include a pair of channel support members 19 and 20, a pair of angle support members 21 and 22, and a flat support member 23. As illustrated in FIG. 1, weldments 10 are utilized to secure the respective support members 19–23 together to define a strong reinforcement structure for the push plate 14.

The invention comprehends an improved arrangement of weldments 10 which provides a strong welded connection between the respective support members.

One such weldment is illustrated in FIG. 2, it being understood that each of the weldments 10 is substantially similar thereto. As shown in FIG. 2, support member 20 includes a cylindrical arcuate portion 24 defining an outer surface 25 adapted to have an edge portion 26 of support member 20 welded thereto in forming the weldment 10. The invention comprehends providing a back-up element 27 on surface 25 prior to the welding operation, as shown in FIG. 3. The back-up element comprises an elongated element which effectively prevents weld metal from being blown past the edge portion 26 during the welding operation, which may comprise a conventional arc welding operation. By preventing such blow-through, an improved weld 28 is obtained effectively autogenously bonding portion 26 of support member 22 to portion 24 of support member 20.

In the illustrated embodiment, the back-up element comprises a rod which, as illustrated, may comprise a circular cross section rod, it being understood that any suitable cross section may be employed within the scope of the invention.

Figure 5:
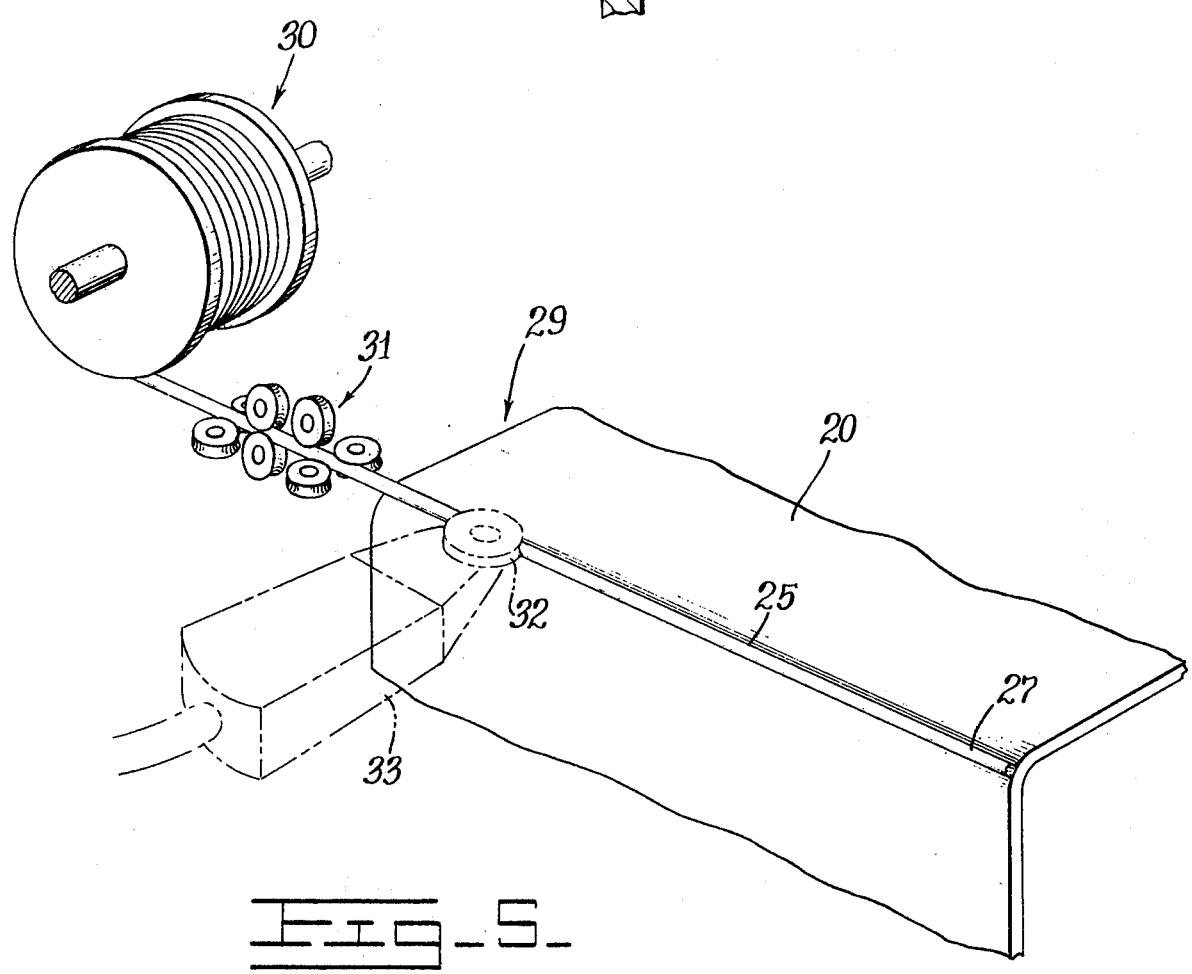
FIG. 5 is a diagrammatic view of an apparatus for effecting such securing of the back-up element from a rolled rod supply.

The back-up elements may be secured to the support member portion 24 by a welding operation as illustrated in FIGS. 4 and 5. As shown therein, the welding operation may comprise a continuous resistance welding operation effected by suitable resistance welding apparatus designated 29. As shown in FIG. 5, the back-up element may comprise a rod provided from a rolled supply generally designated 30, delivered through a suitable straightener apparatus 31 and positioned in contact with the support member surface 25 and an electrode 32 of a welding head 33 of the welding apparatus. As shown in FIG. 4, an opposite electrode 34 may be provided in the form of a wheel engaging the inner surface 35 of the support member portion 25.

Back-up element 27 is suitably positioned on surface 25 to permit the edge portion 26 of edge member 22 to extend beyond the back-up element to partially overlie the weld space 36 conjointly defined by the back-up element 27, edge portion 26 and arcuate portion 24. The extension of edge portion 26 beyond the back-up element permits high tolerances in the construction of the bull-dozer blade, substantially lowering the cost thereof, while yet permitting weld 10 to provide an effective strong weld at each of the joints. Thus, provision of the support member portion 26, as shown in FIG. 3, adjacent weld space 36 permits a conventional arc welding operation to be effected to provide weld 28 of FIG. 2. The back-up element 27 effectively prevents blow-through during the welding operation and effectively assures a full weld of the edge portion 26 to the arcuate portion 24 along the entire extent of the joint.

While the rod 29 may be continuously resistance welded to surface 25, as will be obvious to those skilled in the art, any suitable means, such as spot welding, which effectively maintains the rod in abutment with the surface 25 along the length thereof during the provision of weld 28 may be employed. Maintained close conformity of the back-up element to the support member surface effectively avoids root gaps, thereby effectively preventing undesirable blow-through.

The improved weld 28 obtained in weldment 10 substantially reduces failure of the structural members in such a bulldozer blade which undergoes rigorous service in use. By eliminating such failures, time consuming and expensive repairs are obviated and the blade is maintained structurally sound.

Once attached to the support member 20, rod 27 and support member form a desirable heat sink to absorb heat during the arc welding operation. This will effectively prevent burn-off of the edge portion 26 as might otherwise occur during the arc welding operation where the back-up element is not utilized.

In completing the construction of the bulldozer blade, a back cover 37 may be provided outwardly of the support members as shown in FIG. 1, whereby a strong, low cost bulldozer blade is obtained.

The foregoing disclosure of specific embodiments is illustrative of the broad inventive concepts comprehended by the invention.

What is claimed is:

1. A weldment for a bulldozer blade or the like comprising: a first member having a generally cylindrically curved surface portion; a second member having a generally rectilinear edge portion disposed adjacent said curved surface portion including an end surface and a side surface; an elongated back-up element welded to said curved surface portion of said first member to extend lengthwise thereof and define a substantially continuous elongated weld stop along said curved surface portion extending generally parallel to said edge portion, said second member side surface being in engagement with said back-up element along the length thereof and extending beyond said back-up element whereby said first member surface portion, said back-up element and said second member cooperatively define a weld space overlapped by said edge portion; and arc weld means substantially filling said weld space and defining a substantially continuous welded joint between said surface portion and each of said surfaces of said edge portion securing said surface portion to said edge portion.

2. The weldment of claim 1 wherein said back-up element is welded to said first member with a continuous weld.

3. The weldment of claim 1 wherein said back-up element comprises a cylindrical rod.

4. The weldment of claim 1 wherein said back-up element has a substantially constant cross section along the length thereof.

5. The weldment of claim 1 wherein said second member portion extends beyond said back-up element to adjacent said first member surface portion to partially overlie said weld space.

* * * * *